March 23, 1943. H. E. DUNN 2,314,577
CEMENT BLOCK MOLDING MACHINE
Filed July 29, 1941 6 Sheets-Sheet 1

Fig. 1.

Inventor
Harry E. Dunn
By Liverance and
Van Antwerp
Attorneys

Fig. 3.

March 23, 1943.  H. E. DUNN  2,314,577

CEMENT BLOCK MOLDING MACHINE

Filed July 29, 1941  6 Sheets-Sheet 4

Inventor
Harry E. Dunn
By Liverance and Van Antwerp
Attorneys

March 23, 1943. H. E. DUNN 2,314,577
CEMENT BLOCK MOLDING MACHINE
Filed July 29, 1941 6 Sheets-Sheet 5

Inventor
Harry E. Dunn
By Liverance and
Van Antwerp
Attorneys

March 23, 1943. H. E. DUNN 2,314,577

CEMENT BLOCK MOLDING MACHINE

Filed July 29, 1941 6 Sheets-Sheet 6

Inventor
Harry E. Dunn
By Liverance and Van Antwerp
Attorneys

Patented Mar. 23, 1943

2,314,577

UNITED STATES PATENT OFFICE 2,314,577

CEMENT BLOCK MOLDING MACHINE

Harry E. Dunn, Holland, Mich., assignor to W. E. Dunn Manufacturing Company, Holland, Mich., a corporation of Michigan Application July 29, 1941, Serial No. 404,491

18 Claims. (Cl. 25—41)

This invention relates in general to molding machines and is particularly concerned with certain novel structural improvements in machines for forming hollow blocks from a cementitious material or other aggregate.

One of the novel features of the invention is the provision of a troweling plate which is mounted at one side and above the mold box for movement across the top thereof in contact with the material therein to thereby insure a smooth upper surface on the block. This has obvious advantages over the older form of breaking the block away from the member which it has been pressed against in compressing the material in that a vacuum was created and formed a rough surface on the block.

The mold box itself is rigidly secured to the frame of the machine and novel means have been provided to horizontally reciprocate the cores, which reciprocation takes place during the filling of the mold so that the material is evenly packed throughout.

Novel stripping means have also been incorporated in the machine which elevates the pallet to strip the block from the mold, which means are vertically adjustable and are adjusted to suit the particular aggregate used. Some materials may be compressed a greater amount than others and so the vertically reciprocating stripping means are adapted to be adjusted so that the pallet will have either a higher or lower initial starting point. The pallet will start from a higher point for materials which will compress a lesser amount, and from a lower point for materials which will compress a greater amount.

One of the great advantages which lies in the construction of my machine is the fact that a comparatively wet mix can be used. It is highly desirable that such a wet mix be utilized in forming blocks of a cementitious material, but the use of such a wet mix is impractical without some means for smoothing the upper surface of the block. That is, upon the initial upward movement of the pallet which compresses the material so that a uniform density may be had within the block, a vacuum is created between the material and the member against which it is pressed. If this member is drawn directly away from the block such a vacuum will cause some of the material to adhere to the member in a very wet mix thus producing an extremely rough surface. Also, with a wet mix such as is possible with my machine, it will be packed more evenly is the mold so that more evenness of density throughout the entire block may be had due to the reciprocation of the cores and compression of the material against the troweling plate.

Another object of the present device is the provision of two levers located at one side of the machine, the operation of which will automatically start the motor for reciprocation of the cores, scrape the excess material from the top of the mold box, will move the troweling plate over the mold box, will stop the troweling plate momentarily while an initial compression is given to the material in the mold against the plate and strip the completed block from the mold box. All of these operations will take place automatically merely by the operation of the two levers. A third lever is provided at the top of the machine which, when moved, will automatically start a belt conveyor moving beneath the hopper and open a gate at the end of the belt to permit the material to be fed into the feed box and mold box. The automatic starting and stopping of the motor which causes the reciprocating movement of the cores will also take place at the proper times during the movement through a complete cycle of one of the levers.

In a modified form of the machine novel means have been provided whereby rock face blocks may also be formed by following the same procedure.

Other objects and purposes of the invention will appear more fully as the description proceeds.

To the accomplishment of the foregoing and related ends said invention, then, consists of the means hereinafter fully described and particularly pointed out in the claims.

The annexed drawings and following description set forth in detail certain means for carrying out my invention, said means constituting, however, but one of various ways in which the principle of the invention may be employed.

In said annexed drawings wherein like reference numerals refer to like parts throughout the various views.

The main supporting structure of the machine includes side members 1 which have welded thereto at the front ends thereof a lower front plate 2 and an upper front plate 3 spaced therefrom. At the bottom of each side member and at the outer side thereof an angle member 4 is secured thereto which provides additional support for the machine and strengthens its side members. Spaced apart channel members 5 extend vertically at the rear of the machine along the vertical rear edge of the side plates 1 and are secured thereto such as by welding or any other desired means. Adjacent the top of the side members and extending between the channels 5 and secured thereto is a plate 6. This rear plate is adapted to support certain elements hereinafter described and may, if need be, extend downwardly to the floor, but is not necessary and so I have preferred to show it as terminating substantially half way between the top and the bottom of the side members.

Immediately above the plate 6 an angle 7 extends transversely of the machine between the channel members 5 and is secured thereto. These parts form the main supporting structure as well as a housing for some of the movable parts of the machine.

Near the upper edge of each side plate spaced rearwardly a short distance from the front an angle member 8 is secured at the inner side thereof in such a manner that the horizontal leg of the angle extends inwardly and has a second angle 9 secured thereto by means of the bolt 10. Each end 11 of the mold box is secured to the angles 9, and the sides 12 of the mold box are rigidly secured to the end members 11 so that the mold box itself is rigidly secured as by welding to the supporting structure of the machine. In the formation of the ordinary block, filler members 13 at each end of the mold box and 14 at the rear side thereof will be secured to the adjacent ends and rear of the mold box.

A cover plate 15 extends from the rear of the machine and across the transverse angle member 7 to the front of the machine and has an opening therein above the mold box to thereby complete the housing for the mechanical structures. At the rear of each side member and at the outside thereof a vertically extending supporting member or strip 16 is located and extends upwardly a distance above the housing. A similar strip 17 is located adjacent the front of the machine, one at each side thereof, and has the side plates 18 secured thereto which converge upwardly and terminate at their upper sides in inturned flanges 19 and at their forward ends are flanged inwardly as at 20.

Figure 1:
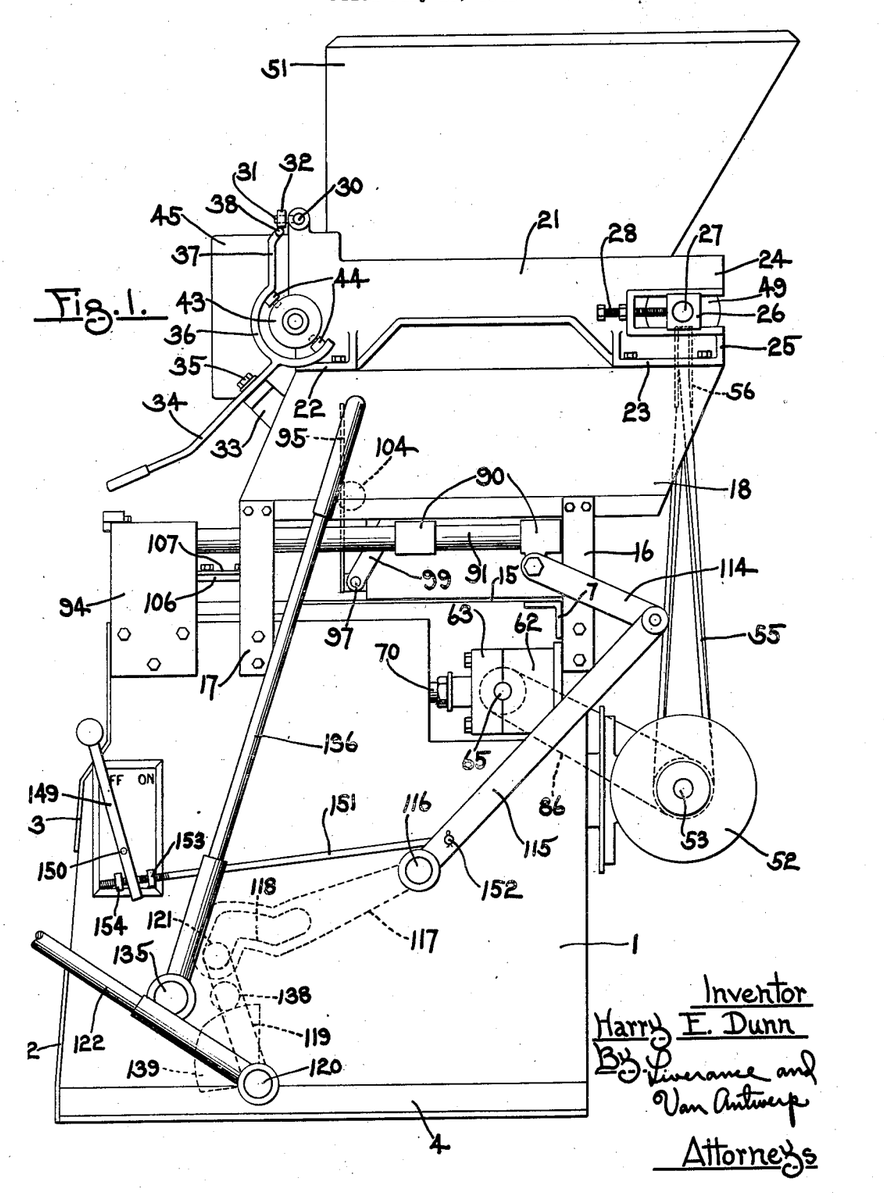
Fig. 1 is a side elevation of the machine.

An elongated casting 21 is located longitudinally of the machine at each side thereof having outturned flanges 22 adjacent the front end and 23 adjacent the rear end thereof. These castings are secured to the inturned flanges 19 of the converging plates 18 by means of bolts, welding or otherwise. The rear end of each casting is vertically bifurcated providing the upper and lower arms 24 and 25 (Fig. 1). A block 26 having its upper and lower sides grooved is received between the arms 24 and 25 and the grooves thereon receive the arms and permit the block to slide longitudinally thereof. These blocks each form bearing members for the transversely extending shaft 27. An elongated threaded bolt 28 is threadedly received in an opening at the rear of the space between the two arms 24 and 25 having its rear end abutting up against the blocks 26 for adjustment purposes.

The front end of each casting 21 provides bearing members 29 at the upper edge thereof to receive a shaft 30. Suitable collars are provided on the shaft adjacent the bearings to prevent longitudinal movement thereof. At one end of the shaft 30 a short arm 31 extends forwardly thereof and is provided with a roller 32. A supporting bracket 33 (Fig. 3) extends outwardly from the front portion 20 of one of the plates 18 and has pivotally mounted thereon a lever arm 34. Above the pivotal point 35 on the lever arm it is bifurcated as at 36 (Fig. 1) and the upper arm of the bifurcation continues upwardly in a vertical direction as at 37 and has integral therewith or welded thereto a camming arm 38 which is normally in contact with the roller 32.

Also located at the front of each casting 21 is a bearing member 39. A shaft 40 extends through these bearings from one side of the machine to the other and for a portion of the length of the shaft 40 it is surrounded by a sleeve 41. At one end of the sleeve a portion 42 of a clutch member is secured thereto and made rotatable therewith, while at the right-hand end of the shaft 41, as viewed in Fig. 3, the other portion of the clutch 43 is keyed thereto. The outer member 43 of the clutch is grooved annularly to receive the pins 44 (Fig. 1) which extend toward each other at diametrically opposed points from the bifurcated end of the lever 34. The shaft 40 and the part of the clutch 43 which is secured thereto is mounted for continual rotation within the sleeve 41 so that when the clutch is engaged a rotative movement will be imparted through the clutch member 42 to the sleeve 41.

Plates 45, one at each side of the machine extend forwardly from and are secured to the forward ends of the castings 21 to more or less guide the aggregate as it is being fed into the mold box.

Figure 2:
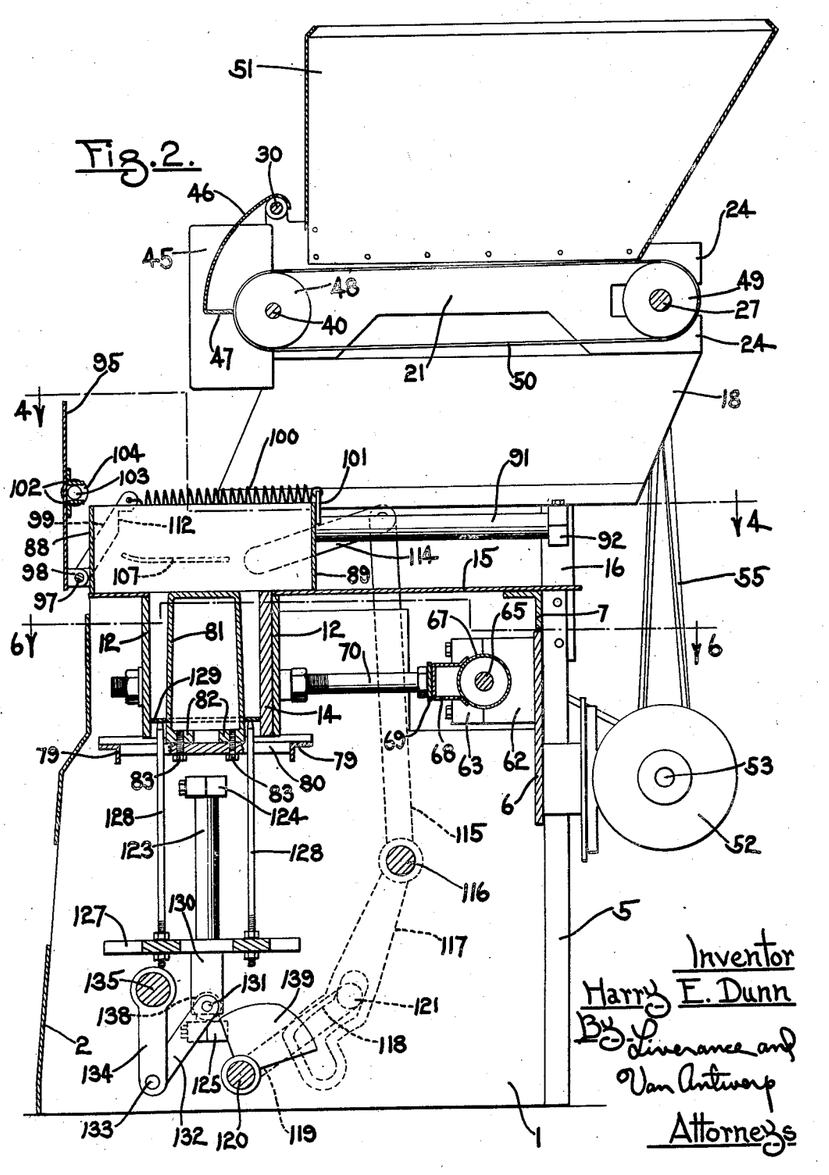
Fig. 2 is a vertical section from front to rear through the machine.

A shield or gate 46 is mounted to rotate about the shaft 30 at its upper end. The gate 46 is curved downwardly and forwardly from the shaft 30 and has an unturned flange 47 at its lower edge (Fig. 2). It will be evident thus far, then, that a movement of the lever 34 toward the right as viewed in Fig. 3 will not only engage the clutch and cause the sleeve 41 to rotate but will also, through the action of the cam lever 38 and rod 31, rotate the shaft 30 in a clockwise direction to thereby raise and open the gate 46. A drum 48 is mounted to rotate with the sleeve 41 at the front of the machine, and at the rear thereof another drum 49 is mounted for rotation with the shaft 27. An endless belt conveyor 50 passes around both drums and is mounted so that its upper run will move forwardly of the machine. A hopper 51 is located above the belt 50 and secured to the castings 21 which is adapted to be filled with the aggregate or cementitious material out of which the blocks are to be formed. The aggregate is fed to the belt from the hopper and is carried toward the front of the machine, but will only be fed into the mold box when the gate 46 is open.

A motor 52 is mounted at the rear of the machine on suitable brackets which are in turn fastened to the rear plate 6. The shaft 53 of the motor at one end thereof is provided with a plurality of pulleys and belts running therefrom to various parts of the machine for movement of the mechanical parts. At the outer end of the shaft 53 the pulley 54 is mounted and has a belt 55 passing therearound which extends upwardly and is twisted so that it may pass around the upper pulley 56 mounted on the shaft 57 which extends from the rear of the machine forwardly and is mounted in brackets 58 extending outwardly from one of the plates 18. At the front end of the shaft 57 a housing 59 is provided within which is located a worm and gear arrangement 60 and 61, the worm 60 being located on the shaft 57 and the gear 61 on the shaft 40 so that during the time the motor is running the shaft 40 will be continuously rotated.

It will also be evident at this point that while the shaft 40 is rotating, as the clutch members 42 and 43 are engaged it will also cause a rotation of the sleeve 41 to move the belt 50 and thus feed the aggregate from the hopper to the gate 46. The lever arm, having been moved to engage the clutch, will also open the gate 46 so that the aggregate carried thereto by the belt 50 will be permitted to drop downwardly into the mold box.

During the time that the aggregate is being fed into the mold box a horizontal reciprocation of the cores therein takes place in order that the aggregate will be evenly packed to aid in giving the block a uniform density. The mechanism which imparts to the cores a reciprocatory movement includes split bearings spaced apart laterally of the machine at the rear thereof and mounted on the forward or inner side of the plate 6. The part of each bearing which is secured directly to the plate is indicated at 62, and the other part thereof 63 is secured thereto by suitable bolts. At each side of the machine a short shaft 64 is located within the split bearing members which are connected by an eccentric shaft 65. Rotation of the shafts 64 will cause an eccentric rotating motion of the intermediate shaft 65.

Near each end of the intermediate shaft plates or discs 66 ride freely thereon and have secured thereto a drum 67. The eccentric movement of the shaft 65 will thereby impart a similar eccentric movement to the drum 67. At the forward side of the drum a bracket 68 is rigidly secured to which is fastened an elongated bar 69. Forwardly extending rods 70 are secured to each end of the bar 69, each of which is threaded for a considerable distance at its forward end. A floating bracket 71 is provided at each side of the machine with upwardly extending spaced apart arms 72 and between the arms a sleeve 73 is located through which the rod 70 passes. The bracket 71 is thereby hung on the rod 70 and is prevented from having any relative movement therewith by suitable nuts threaded to the rod 70 and bearing against the outer sides of the arms 72.

An outer sleeve 74 surrounds each sleeve 73 between the two arms but is shorter than the sleeve 73 and is pivotally mounted to a bracket 75 secured to each of the side members 1. A bolt 76 passes through one side of the bracket 75 and a bolt 77 passes through the side frame member into the sleeve 74 to thereby permit a pivotal movement thereof.

Figure 7:
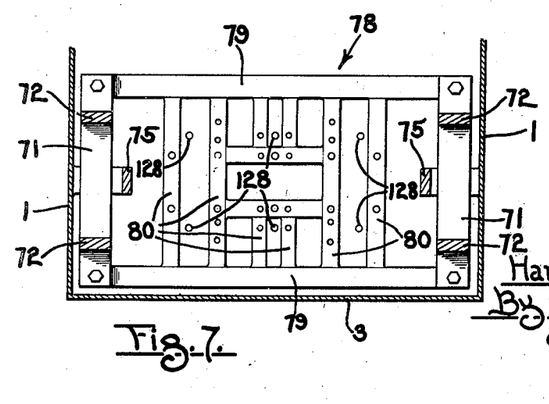
Fig. 7 is a plan view of the reciprocating plate on which the cores are mounted.

The core carrier is generally indicated at 78 in Fig. 7 and is composed of a longitudinal angle member 79 at each side thereof and a plurality of cross bars 80, which bars may be either integral with the angles or welded thereto and may assume any desired number or direction between the angles. The particular design of the carrier shown is purely arbitrary, it being necessary to provide the cross members only in such a way that the cores may be properly mounted thereon.

The cores 81 are provided at their lower ends with cross pieces 82 having openings therein to receive bolts 83. These bolts are adapted to pass upwardly through alined openings in the cross bars of the carrier and thereby rigidly secure the cores thereto.

One end of the motor shaft 53 is provided with pulleys 84 which are connected with similar pulleys 85 on one of the short shafts 64 by means of belts 86. It will therefore be evident that during the running of the motor a continuous rotation of the shafts 64 will take place, which in turn will impart an eccentric rotative movement to the intermediate shaft 65, drum 67 and its connected parts through the rods 70. The core carrier, being mounted upon the rods 70 by means of the brackets 71 will also have a horizontal reciprocating movement during all the time that the motor is running.

At the top of the machine and positioned above the mold box for horizontally reciprocating movement is a feed box through which the aggregate is fed into the mold box. After the mold box is filled a rearward movement of the feed box will scrape off any excess material therefrom. A troweling plate is also secured to the feed box and is adapted to move therewith in such a manner that it will slide across the top of the mold box in contact with the material therein. The troweling plate will be stopped momentarily while the material is compressed thereagainst, so that the final block will have a uniform density, and then will continue its movement rearwardly thereby imparting a smooth, even upper side to the finished block. This is somewhat different from the older method of breaking the compressed material away from the member against which it has been compressed. In such older method a rough surface is inevitable because a certain amount of vacuum will be present causing some of the aggregate to adhere to the member. This is obviated by the use of the troweling plate which is moved away from the material and out of contact therewith by a sliding movement.

The feed box itself is composed of the two sides 87, a front side 88 and a back 89. Brackets 90 extend outwardly at each side of the feed box and surround and are adapted to have a longitudinal sliding movement along the rods 91 which are supported at their rear ends by split bearings 92 secured to the rear vertical bars 16 and at their front ends by means of split bearings 93 which are secured to the inner sides of the plates 94 attached to the upper and forward portions of the side members 1.

The troweling plate 95 is located in front of the forward side 88 of the feed box by means of brackets 96 on the feed box which have a rod 97 rotatably mounted therebetween. Other brackets 98 which are located at the lower rear edge of the troweling plate extend rearwardly and are secured to the rod 97 and move therewith. Links 99 are attached at one end to each end of the rod 97 and extend rearwardly and upwardly and are connected at their upper ends by means of tension springs 100 to plates 101 at the rear side of the feed box. These springs tend to maintain the troweling plate in a vertical position and when the plate is moved forcibly to horizontal position for its troweling action on the aggregate it is moved against the tension of the springs.

The troweling plate at its rear side and substantially centrally located with respect thereto has a pair of angles 102 extending thereacross. A stub shaft 103 is located at each end of and between the angles 102 and are welded thereto, and support at the outer end of each one a roller 104. Each plate 94 at the inner side thereof is provided with a block 105 which has a horizontal inwardly extending plate 106 secured thereto on which is located a track member 107 which is curved at its forward end upwardly, the one located at the right hand side of the machine extending to a point adjacent one of the rollers 104, and the other track terminating short of such point. A rod 108 extending vertically upwardly from the right hand bearing member 93 has rotatably mounted thereon an arm 109 which extends toward the adjacent roller 104. The arm 109 has a finger 110 extending upwardly therefrom against which is located one end of a coil spring 111, the other end of which is secured to the rod 108 and thereby maintains the arm 109 against its stop member which consists of one of the bolts which secures the parts of the split bearing 93.

As the mechanism for moving the feed box rearwardly is set in motion, the roller 104 at the right hand side of the machine will be forced downwardly against the track 107 and will move thereagainst to force the troweling plate toward a horizontal position. As the feed box moves rearwardly and the rollers 104 bear against and follow the under side of the tracks 107 the troweling plate will assume a horizontal position, and the horizontal portions of the tracks are located in such a position that the plate will bear snugly against the upper side of the mold box. As the feed box moves rearwardly still farther the rollers 104 will come to the ends of the track 107 at which time the springs 100 through their connection with the links 99 will draw them upwardly. The bottoms of the links being connected with the rod 97 will force a rotation thereof, thereby bringing the troweling plate back to its normal vertical position. When the feed box and troweling plate are moved forwardly for the next operation, the right hand roller 104 will trip the arm 109 against the tension of its spring 111 and after it has passed the arm it will be returned to its normal position rearwardly of the roller thereby holding it in position ready to start the roller 104 downwardly against the tracks at the next movement. It is to be noted that the rollers are above the tracks in the vertical position of the troweling plate and will clear them in its forward movement. Also the links 99 are notched as at 112 to receive the corners of the frontmost brackets 90.

The various mechanisms which are manually operated to actuate the feed box, troweling plate, the initial compression of the aggregate against the troweling plate and the stripping means will now be explained. Extending outwardly at each side of the feed box and connected with the rear brackets 90 are arms 113. One end of a link 114 is pivotally mounted on each of the arms 113 and has pivotally connected to its other end another link 115 which extends downwardly therefrom and is secured directly to the horizontal shaft 116 and is rotatable therewith. The shaft 116 extends transversely of the machine and is mounted for rotation in suitable bearings on the side supporting members. Also secured to the shaft 116 at one side of the machine is the downwardly extending cam arm 117 which may be made as an integral casting with the link 115. A slot 118 is provided in the lower end of the arm 117 having a configuration substantially like that shown in Figs. 1 and 2. An arm 119 is secured at one end to the horizontal shaft 120 and is adapted to move therewith and has a cam roller 121 at its upper end which traverses the slot 118 in the arm 117. It is to be noted that a counterclockwise rotation of the shaft 120 will cause a similar movement of the arm 119 which will impart a clockwise rotation of the shaft 116 through the camming action of the roller 121 in the slot 118. This clockwise rotation of the shaft 116 through the links 115 and 114 will impart a rearward movement to the feed box and the troweling plate connected therewith.

The outer end of the shaft 120 is directly connected with a lever arm 122 which is to be manually operated to actuate the various parts just mentioned. From the shape of the slot 118 it will be evident that the central portion thereof is concentric with the shaft 120. During the initial movement of the arm 119 as viewed in Fig. 2 a rapid rearward movement of the feed box will occur until the troweling plate has assumed a horizontal position immediately above the mold box. At this point a further rotation of the shaft 120 will cause the cam roller 121 to traverse the central portion of the slot 118 during which time no further movement of the troweling plate will occur because of the concentric relationship between this portion of the slot and shaft 120. While the cam roller is moving across this dwell portion of the slot, the troweling plate will remain stationary but when it reaches the end of the slot a further movement of the arm 117 will take place thereby imparting a further rearward movement of the feed box and troweling plate to its rearmost position.

Figure 3:
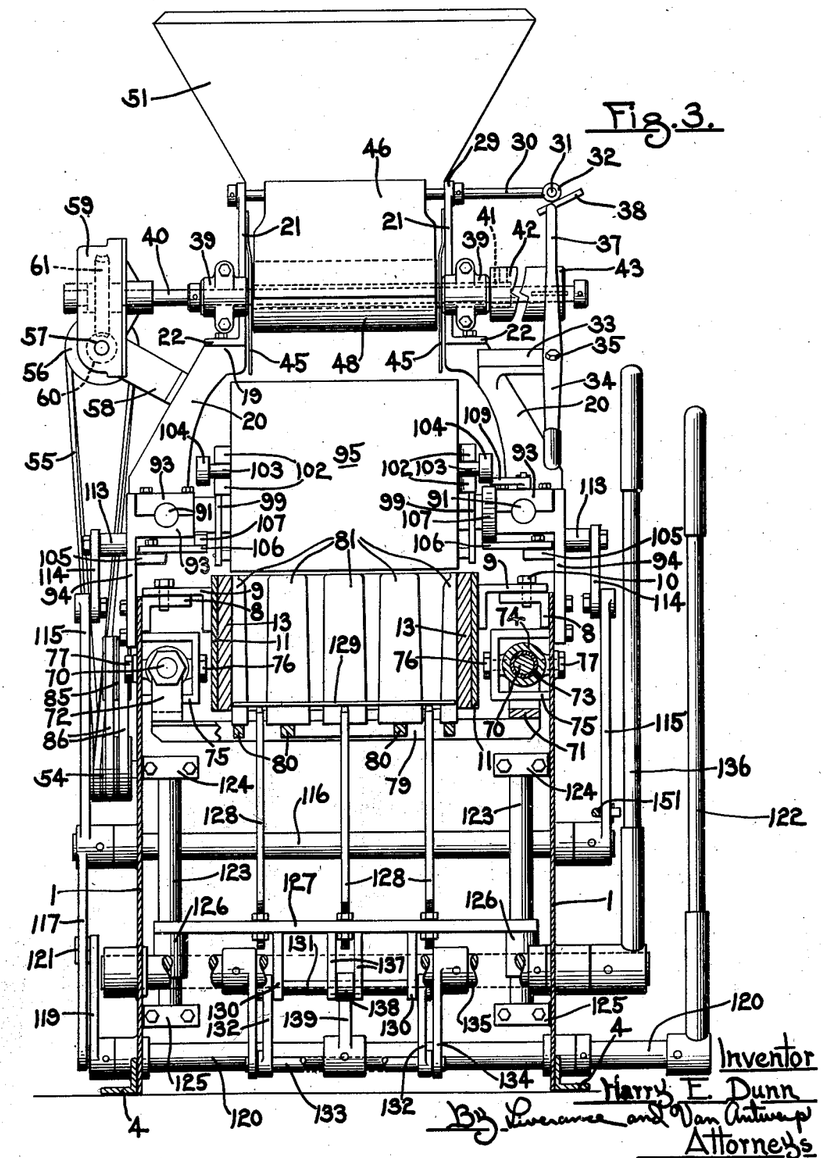
Fig. 3 is a vertical transverse section through the machine, certain parts being shown in front elevation.
Figure 4:
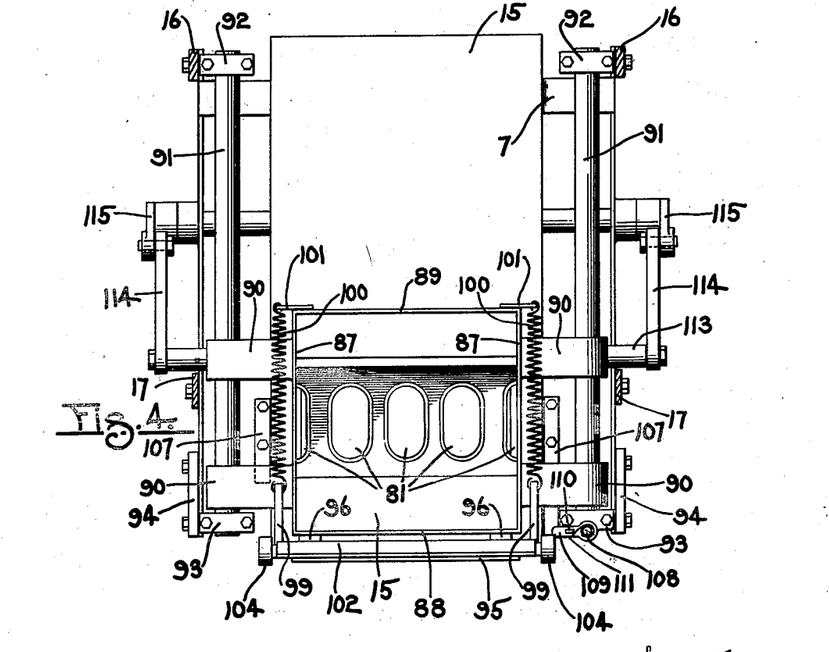
Fig. 4 is a horizontal section taken substantially on the plane of line 4—4 in Fig. 2 looking in the direction of the arrows.
Figure 5:
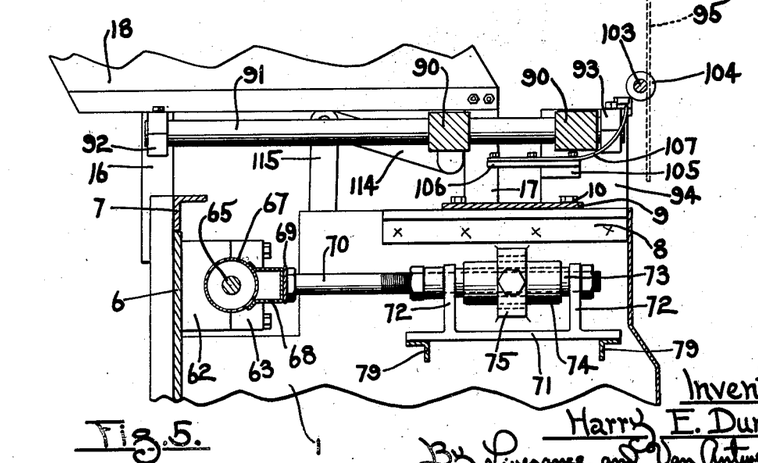
Fig. 5 is a fragmentary part side elevation and part sectional view of a portion of the core reciprocating mechanism.
Figure 6:
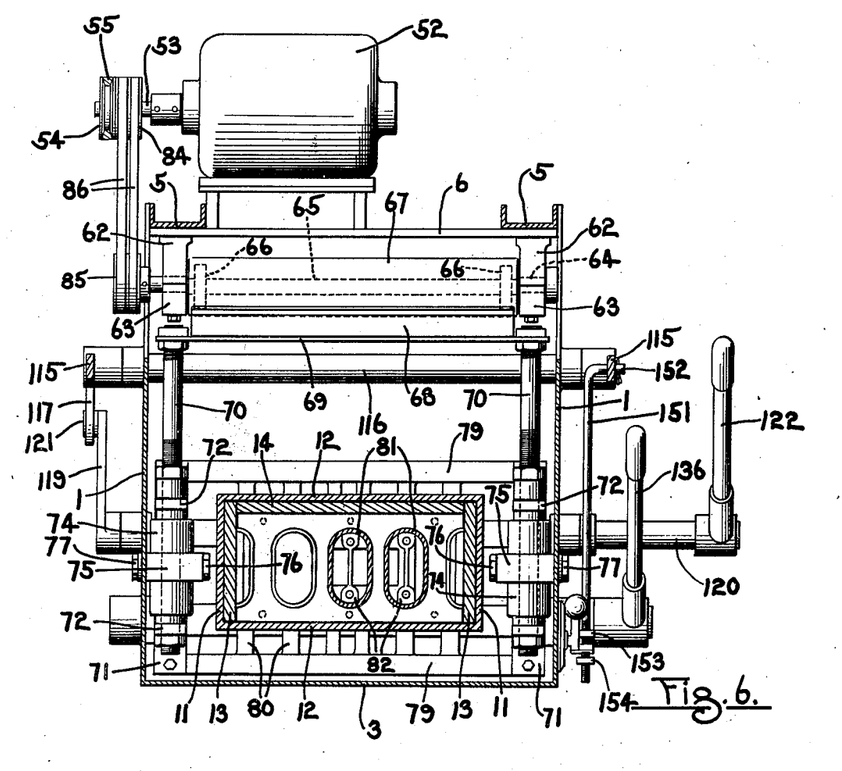
Fig. 6 is a horizontal section taken substantially on the plane of line 6—6 in Fig. 2 looking in the direction of the arrows.

Within the machine and mounted at each side thereof are vertical rods 123 each of which is secured at its upper end to a side member of the machine by means of the split bearing 124 and at its lower end by the split bearing 125 (Fig. 3). Sleeves 126 are provided which are adapted to slide longitudinally of the rods 123 and which have mounted at their upper sides and extending therebetween a crosshead 127 which has a plurality of vertically extending spaced apart rods 128 adjustably mounted thereon. As shown, there are three of these rods at each side of the crosshead, although the particular number used may vary, and at their upper ends these rods support the pallet 129. As mentioned hereinbefore different aggregates may be compressed different amounts and since the vertical distance through which the crosshead 127 and the pallet 129 move is always the same, some adjustment must be provided to take care of the different aggregates which may be used. For this reason the lower ends of the rods 128 threadedly engage suitable openings in the crosshead 127 and are secured in their adjusted position by means of suitable nuts. This type of connection will enable the rods 128 to have either a higher or lower initial position, the particular position depending upon the amount that the particular aggregate can be compressed. The openings in the pallet through which the cores extend are sufficiently large so that little or no reciprocating movement is imparted thereto.

At the under side of the crosshead 127 and centrally located with respect thereto there are provided two spaced apart downwardly extending arms 130 which support a horizontal rod 131. This rod extends through and beyond the arms 130 and has mounted at each end thereof one end of a link 132. A rod 133 extends between the other ends of the links 132 which has mounted at its outer ends a second link 134 which extends upwardly and is securely mounted on a horizontal shaft 135 and is adapted to rotate therewith. The shaft 135 extends transversely of the machine and is mounted for rotative movement in suitable bearings secured to each of the side supporting members. A manually operable lever arm 136 is attached to the outer end of the shaft 135 so that a movement thereof toward the front or rear of the machine will impart a rotative movement to the shaft 135. This particular mechanism just explained constitutes the stripping mechanism. Beginning from the lower position as shown in Figs. 2 and 3, the lever arm 136 is moved toward the operator at the front of the machine thus rotating the shaft 135 in a counter-clockwise direction. Such a rotation of the shaft, through the links 134 and 132, by means of their connection with the crosshead 127, will elevate the crosshead and rods connected thereto together with the pallet resting on the top thereof. The pallet with the finished blocks thereon is thus elevated to the top of the machine thus permitting the block to be removed.

Two other arms 137 also extend downwardly from the under side of the crosshead 127 but are spaced a shorter distance apart and are located between the arms 130. The shaft 131 also passes through suitable openings at the lower ends of the arms 137 and has mounted thereon and between the arms a roller 138. Immediately beneath the roller and substantially centrally of the shaft 120 a cam 139 is secured and is adapted to rotate with said last-mentioned shaft. The cam is adapted to contact the roller 138 and thereby elevate the pallet with the aggregate thereon a short distance during the time that the cam roller 121 is traversing the dwell in the slot 118, which is the time that the troweling plate is stationary at the top of the mold box.

It will thus be seen that the movement of a single lever, after the mold box has been filled with the aggregate, will scrape off the excess material therefrom, move the troweling plate over the mold box, compress the material thereagainst and perform the finishing troweling action to smooth the upper surface of the block. The lever 136 is then operated to strip the block from the mold at which time the machine is in readiness for the formation of a succeeding block. The finished block of the more common variety is shown at 140 in Fig. 8.

Figures 10, 11:
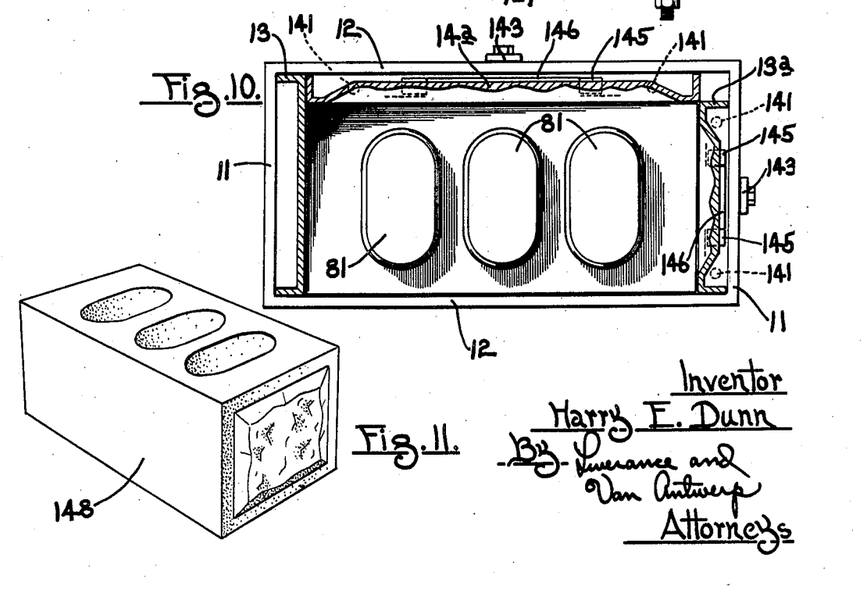
Fig. 10 is a horizontal section through the device shown in Fig. 9.
Fig. 11 is a perspective view of one of the finished blocks of the modified form.

It is occasionally desirable to make what is commonly known as a rock face block such as shown at 148 in Fig. 11. In this form of block one or more of the sides has an irregular concave surface, while the rest of the sides are smooth. The means by which a block of this nature can be formed by the use of substantially the same mechanism is shown more clearly in Figs. 9 and 10. Substantially all of the mechanism heretofore described is utilized in the making of this block, and the operation of the two main levers to actuate the various parts of the machine is the same as before. The main differences lie in the fact that instead of providing the usual filler members 13 and 14, these members take on a configuration substantially like that shown at 13a and 14a in Figs. 9 and 10. Instead of having a smooth inner surface these filler members are concave to provide a comparatively rough outwardly extending finished surface on the block as shown. In this form of the invention, however, the block can obviously not be stripped away from the filler members in the usual way, it being necessary that these members be moved upwardly with the finished block as it is being stripped and then removed therefrom after the stripping action is finished.

Figures 8, 9:
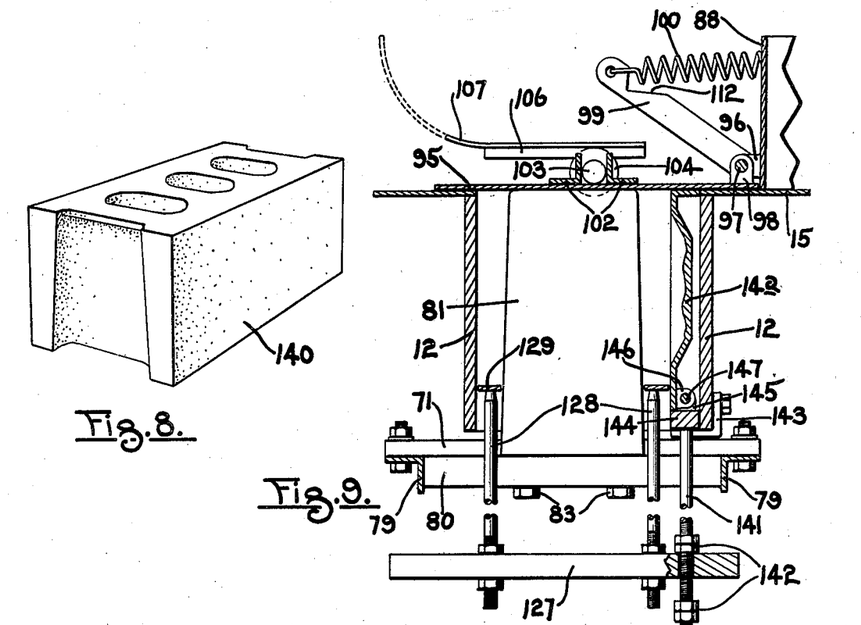
Fig. 8 is a perspective view of the finished block in one form of the invention.
Fig. 9 is an enlarged sectional detail of a portion of the machine showing a modified form of end members within the mold box to attain a different result.

In this form of the invention I provide an additional plurality of vertical rods 141 which are threaded at their lower ends and extend through openings in the crosshead 127. These openings are sufficiently large to permit a sliding movement of the threaded end of the rods 141 therethrough. It is necessary that the filler members remain stationary during the initial compression of the material in the mold box, but move with the material during the stripping action. For this reason I have provided vertically spaced apart lock nuts 142 at the bottoms of the rods 141, one located above the crosshead 127 and the other therebelow. In the lowermost position of the crosshead the under side thereof will be adjacent the lower lock nuts 142 and during the compression of the aggregate the crosshead will move upwardly and will contact the uppermost lock nuts 142 and will be substantially in the position as shown in Fig. 9.

Brackets or angle members 143 are secured to the outer ends and sides 11 and 12 of the mold box and have lower horizontal legs extending beneath the mold box which are provided with openings through which the upper ends of the rods 141 pass. Each filler member is provided with a bottom piece 144 which rests on the lower horizontal leg of the brackets 143 to thereby limit the downward movement thereof. The upper ends of the rods 141 are secured to these bottoms 144 so that the filler members will move with the rods.

Spaced apart brackets 145 extend upwardly from each of the bottom members 144 and have openings therein in alinement with similar openings in rearwardly extending brackets 146 secured to the main part of the filler members. A rod 147 passes through these alined openings to thereby permit a relative rotative movement between the main portion of the filler member and the bottom strip 144 thereof.

In this form of the invention the filler members will move upwardly with the pallet during the stripping action, but when the top of the machine is reached the filler members will drop away from the block by reason of their pivotal movement about the rods 147 to thereby permit the finished block with the rock faces thereon to be removed from the machine.

Means have also been provided to automatically turn the motor off and on by the operation of the lever 122. This means can be seen clearly in Fig. 1 and comprises a switch member 149 pivoted between its ends at 150. The switch is connected in the usual way to the motor 52. An elongated rod 151 is turned at one end to be mounted on the link 115 as at 152. Adjacent the other end of the rod 151 spaced apart collars 153 and 154 are provided between which the lower end of the switch member 149 extends. As shown, the switch is in the "off" position, the feed box and troweling plate having been moved to their rearmost positions. When the lever arm 122 is moved away from the operator toward the rear of the machine, the link 115 will move forwardly and the collar 153 thereon will contact the lower end of the switch arm 149 to move its upper end toward the right to the "on" position thereof thereby starting the motor. The motor continues to run throughout the filling of the mold box and until the lever 122 has been moved forwardly a sufficient distance so that the collar 154 will force the switch arm 149 to its "off" position.

*Operation*

Before a block is to be formed the various parts are in the position as shown in Fig. 2 with the motor running. The lever arm 34 at the top of the machine will then be moved toward the right thereby engaging the clutch parts 42 and 43 to start the belt 50 moving beneath the hopper 51. Movement of the lever 34 will simultaneously open the gate 46 through the action of the cam lever 38 against the roller 32 thereby permitting the aggregate from the hopper to be delivered by means of the belt to the feed box and down into the mold box around the cores therein. At this same time, and all during the period that the motor is running, a horizontal reciprocation of the cores 81 will take place because of their connection with the mold carrier 78 through the bracket 71 on the rod 70 and the eccentric shaft 65 driven by the short shafts 64 which have a direct connection through the belts 86 with the motor. The feeding of the aggregate and the reciprocation of the cores continues until the mold box is filled. The gate is then closed stopping further feeding of the aggregate and movement of the belt 50, and the arm 122 is moved forwardly of the machine toward the operator. During the initial movement of the lever the feed box will move rearwardly at a rather rapid rate and will carry with it the troweling plate 95 which, by means of the tracks 107 and the rollers 104, will be continually moving toward a horizontal position. This movement continues until the troweling plate is immediately above the mold box in substantially the position shown in Fig. 9. At this point the dwell in the slot 118 will have been reached thereby causing the troweling plate to remain in this position while the cam 139 bears against the roller 138 and elevates the pallet a short distance sufficient to compress the material therein upwardly against the under side of the troweling plate. During this time the lever 122 is being moved forward continuously and after the compression of the material has taken place the troweling plate moves rearwardly by the action of the cam roller 121 traversing the remainder of the slot 118. Immediately before the end of the movement of the lever 122 the motor will be turned off automatically by means of the switch connection described above and the rollers 104 on the troweling plate will have reached the rearmost ends of the tracks 107 whereupon the action of the springs 100 through the links 99 will return the troweling plate to its normal vertical position as shown in Fig. 1.

The block having thus been molded and formed and the material therein compressed so that the block will have a uniform density throughout, the lever arm 136 will then be moved forwardly of the machine toward the operator causing a rotation of the shaft 135 and an elevation of the pallet with the block thereon through the action of the links 134 and 132 and their connections with the crosshead 127. After the block has been stripped and removed from the machine, a new pallet is placed on the upper ends of the rods 128 which are then lowered by a return action of the lever 136. The lever 122 is then moved back to its original position whereupon the motor is again started and the operation is repeated as often as is desired.

Other modes of applying the principle of my invention may be used instead of the one here described, change being made as regards the structure herein disclosed provided, however, that the means stated by any of the following claims or the equivalent of such stated means be employed.

I, therefore, particularly point out and distinctly claim as my invention:

1. The combination with a molding machine having a supporting frame and a mold box secured thereto, of a pallet located at the lower side of and within said mold box, means to introduce a quantity of cementitious material into said mold box, a troweling plate normally in a position other than horizontal, means to move said plate over the top of said mold box in a horizontal position from one side thereof to the other in contact with the contents thereof, means for elevating said pallet with the material thereon a short distance to compress the material against said plate, and means to strip the resulting blocks from said mold box after the troweling plate has moved past the mold box.

2. The combination of elements defined in claim 1, combined with cores within said mold box, and means to horizontally reciprocate said cores to pack the material as it is fed to the mold box.

3. The combination of elements defined in claim 1, combined with means to stop said troweling plate in its movement over said mold box during the compressing of the material thereagainst.

4. A molding machine comprising, a supporting frame, a mold box secured to said frame, means to feed a quantity of cementitious material into said mold box, a troweling plate located above and at one side of said mold box in a substantially vertical position, means to move said plate across the top of said mold box in a horizontal position from one side thereof to the other to thereby form a smooth surface on the upper side of the resulting block, and means to compress the material against the under side of said plate to form a uniform mass.

5. The combination of elements defined in claim 4, combined with means to stop said troweling plate in its movement across said mold box during the compressing of the material thereagainst.

6. In a molding machine for making blocks of cementitious material, the combination with a mold box and stripping means, of a troweling plate normally held in a position other than horizontal, means to move said troweling plate across the top of the mold box in contact with the top of the block therein, and means to move said plate to a horizontal position during such movement across the top of the mold box.

7. In a molding machine for making blocks of cementitious material, the combination with a mold box and stripping means, of a troweling plate located at one side of the mold box normally in a position other than horizontal, means to move said plate across the top of the mold box in contact with the upper side of the block, and means interposed in the path of movement of said plate to force it to horizontal position to thereby impart a smooth finish to the upper side of the block.

8. In a molding machine for making blocks of cementitious material, the combination with a mold box and stripping means, of a feed box through which material is fed to the mold box, a troweling plate pivotally mounted on one end of said feed box and movable therewith, and means to move said feed box across the mold box to scrape off excess material, said plate moving with said feed box and smoothing the upper surface of the block before stripping.

9. In a molding machine for making blocks of cementitious material, the combination with a mold box, of a troweling plate located thereabove, rollers on said plate, tracks mounted on the machine adjacent said rollers, and means to move said plate rearwardly, whereby said rollers will contact the under side of said tracks and force said plate downwardly against the top of said mold box and the material therein to form a smooth surface on the finished block.

10. In a molding machine for making blocks of cementitious material, the combination with a mold box, of a pivotally mounted troweling plate located thereabove, rollers on said plate, tracks mounted on the machine adjacent said rollers, and means to move said plate rearwardly over said mold box, whereby said rollers will contact said tracks and move said plate about its pivot axis to a horizontal position against the material in the mold box to thereby form a smooth surface on the finished block.

11. In a molding machine for making blocks of cementitious material, the combination with a mold box, of a feed box slidably mounted thereabove, a troweling plate pivotally mounted on the forward side of said feed box normally in a position other than horizontal, means to move said feed box rearwardly across the mold box, and means to move said plate to horizontal position to slide across the material in the mold box.

12. The combination of elements defined in claim 11, wherein said first named means automatically stops the movement of said plate temporarily and then continues to move it rearwardly.

13. The combination of elements defined in claim 11, wherein said last named means includes rollers on said plate and tracks on the machine located in the path of movement of said rollers.

14. A molding machine for making hollow blocks, comprising, a supporting frame, a mold box mounted on said frame, a feed box above said mold box, a troweling plate mounted on said feed box in a position other than horizontal, a shaft rotatably mounted on said frame, means for rotating said shaft, connections between said shaft and feed box so arranged that upon rotation of the shaft in one direction the feed box and troweling plate will move rearwardly of the machine over said mold box, and means interposed in the path of movement of said troweling plate to move it to horizontal position for sliding movement across the material in said mold box.

15. The combination of elements defined in claim 14, combined with means associated with said shaft such that a continual rotation thereof will cause said plate to stop for a short period of time.

16. The combination of elements defined in claim 14, combined with means associated with said shaft and so arranged that a continual rotation thereof will compress the material in the mold box upwardly against said troweling plate.

17. In a molding machine for making blocks of a cementitious material, the combination with a mold box and a hopper for the material said hopper having an opening in its bottom, of means to feed the material to the mold box including, a conveyor belt below the opening in said hopper, a gate at one end of said conveyor belt, and means to simultaneously open said gate and move said conveyor belt, whereby material thereon will drop into said mold box.

18. In a molding machine for making blocks of cementitious material, a mold box, a hopper having an opening in its bottom, a conveyor belt extending below the opening in the hopper and having a delivery end from which material is delivered into said mold box, a gate at the delivery end on said conveyor belt, power means to move said conveyor belt actuating through an engageable and disengageable clutch and a lever connected to said clutch and to said gate and acting to simultaneously engage said clutch and open said gate and to simultaneously disengage said clutch and close said gate.

HARRY E. DUNN.